United States Patent
Katsumoto (10) Patent No.: US 9,303,796 B2
(45) Date of Patent: Apr. 5, 2016

(54) METHOD OF PRODUCING FLOW CHANNEL DEVICE, AND FLOW CHANNEL DEVICE

(71) Applicant: Sony Corporation, Tokyo (JP)

(72) Inventor: Yoichi Katsumoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 69 days.

(21) Appl. No.: 14/227,713

(22) Filed: Mar. 27, 2014

(65) Prior Publication Data

US 2014/0305533 A1    Oct. 16, 2014

(30) Foreign Application Priority Data

Apr. 12, 2013   (JP) ................................. 2013-084382

(51) Int. Cl.
| | |
|---|---|
| *B32B 37/00* | (2006.01) |
| *B29C 65/00* | (2006.01) |
| *F16L 11/04* | (2006.01) |
| *B01L 3/00* | (2006.01) |
| *B32B 27/28* | (2006.01) |
| *B32B 15/08* | (2006.01) |
| *B32B 15/20* | (2006.01) |
| *B32B 27/08* | (2006.01) |
| *B32B 3/08* | (2006.01) |
| *B32B 3/10* | (2006.01) |
| *B29C 47/06* | (2006.01) |

(52) U.S. Cl.
CPC ........... *F16L 11/04* (2013.01); *B01L 3/502707* (2013.01); *B32B 3/08* (2013.01); *B32B 3/10* (2013.01); *B32B 15/08* (2013.01); *B32B 15/20* (2013.01); *B32B 27/08* (2013.01); *B32B 27/281* (2013.01); *B01L 2200/0689* (2013.01); *B01L 2300/0645* (2013.01); *B01L 2300/0816* (2013.01); *B01L 2300/0874* (2013.01); *B01L 2300/0887* (2013.01); *B29C 47/065* (2013.01); *B32B 37/00* (2013.01); *B32B 2307/306* (2013.01); *B32B 2307/714* (2013.01)

(58) Field of Classification Search
None
See application file for complete search history.

(56) References Cited

U.S. PATENT DOCUMENTS

| | | | |
|---|---|---|---|
| 6,293,012 B1 * | 9/2001 | Moles ....................... | 29/890.124 |
| 6,321,791 B1 | 11/2001 | Chow | |
| 6,605,366 B2 * | 8/2003 | Yamaguchi et al. ....... | 428/473.5 |
| 2009/0074615 A1 * | 3/2009 | Moles .......................... | 422/68.1 |

FOREIGN PATENT DOCUMENTS

JP      2008-078104      4/2008

* cited by examiner

*Primary Examiner* — Lyle Alexander
*Assistant Examiner* — Jennifer Wecker
(74) *Attorney, Agent, or Firm* — K&L Gates LLP (57) ABSTRACT

There is provided a method of producing a fluid channel device including laminating a plurality of polyimide films including at least one polyimide film having a port and at least one polyimide film having a channel, the polyimide films including at least one thermoplastic polyimide film; and adhering a plurality of the polyimide films by applying heat such that the ports are communicated with the channels. There is also provided the flow channel device produced by the method.

7 Claims, 10 Drawing Sheets

METHOD OF PRODUCING FLOW CHANNEL DEVICE, AND FLOW CHANNEL DEVICE

CROSS REFERENCES TO RELATED APPLICATIONS

The present application claims priority to Japanese Priority Patent Application JP 2013-084382 filed in the Japan Patent Office on Apr. 12, 2013, the entire content of which is hereby incorporated by reference.

BACKGROUND

The present application relates to a method of producing a flow channel device for distributing a fluid in flow channels, and the flow channel device.

SUMMARY

In the related art, flow channel devices produced by a variety of materials and methods for a variety of applications have been proposed.

U.S. Pat. No. 6,321,791 discloses a multilayer micro flow channel device where a plurality of substrates having ports and channels are laminated to communicate the ports with the channels. In particular, the multilayer micro flow channel device described in U.S. Pat. No. 6,321,791 has the channels branched among the respective substrates (see for example, columns 6, 7 and 12 in U.S. Pat. No. 6,321,791).

Japanese Patent Application Laid-open No. 2008-78104 discloses a solid polymer fuel cell. The fuel cell includes a base material composed of stainless steel, titanium, aluminum or the like, and a shaped body made of a plastic film or a plurality of plastic films laminated on the base material. The base material and the shaped body have through-holes for distributing a fuel gas and a coolant within flow channels, grooves for forming the flow channels, and the like (see for example paragraphs [0027], [0047] etc. in Japanese Patent Application Laid-open No. 2008-78104).

Flow channel devices are used by users under various environments. Therefore, a flow channel device being durable under given environments is desirable.

There is a need for providing method of producing a flow channel device being durable under given environments, and the flow channel device.

According to an embodiment of the present application, there is provided a method of producing a fluid channel device, including laminating a plurality of polyimide films including at least one polyimide film having a port and at least one polyimide film having a channel, the polyimide films including at least one thermoplastic polyimide film. A plurality of the polyimide films are adhered by applying heat such that the ports are communicated with the channels.

Upon laminating, heating and adhering a plurality of the polyimide films including at least one polyimide film, the adhesion among a plurality of the polyimide films can be enhanced. In this way, there can be provided a flow channel device that can be used under the environment where a fluid flowing through the flow channels formed by the ports and the channels has a high pressure.

At least one non-thermoplastic polyimide film may be used for a plurality of the polyimide films. By using the non-thermoplastic polyimide film where deformation is suppressed when a heat is applied, the flow channels can be formed with high precision.

Upon laminating the polyimide films, the thermoplastic polyimide films and the non-thermoplastic polyimide films are laminated alternately. This promotes the enhancement of the adhesion and the formation of the highly precise flow channels as described above.

Upon adhering the polyimide films, a pressure may be applied to a plurality of the polyimide films laminated. This further enhances the adhesion among the polyimide films.

The pressure may be applied to a plurality of the polyimide films laminated while a plurality of the polyimide films laminated are sandwiched between two plate materials disposed in parallel. This allows to apply a uniform pressure to the surfaces of the polyimide films so that fine flow channels can be formed with high precision.

Upon adhering the polyimide films, the polyimide films laminated may be heated at around a glass transition temperature of polyimide.

At least one the polyimide film of a plurality of the polyimide film has a metal film disposed on a surface of the polyimide film. Before the lamination, the metal layer may be further processed to form a metal pattern having any shape. In this way, the flow channel device having the metal pattern can be provided, thereby adding electrical or mechanical functions to the flow channel device.

The method of producing the fluid channel device may further includes housing a plurality of the polyimide films laminated within an air-tight holding chamber. Upon adhering the polyimide films laminated, the chamber may have a reduced pressure, which prevents voids from remaining within the flow channels.

The flow channel device may be used for distributing a fluid containing biological samples.

According to an embodiment of the present application, there is provided a flow channel device including a main body, a port and a channel.

In the main body, a plurality of polyimide films including at least one polyimide film and at least one polyimide film are laminated and adhered.

The port is disposed on at least one polyimide film of a plurality of the polyimide films.

The channel is disposed on at least one polyimide film of a plurality of the polyimide films to form flow channels being communicated with the port.

By providing the main body where a plurality of the polyimide films including at least one polyimide film and at least one polyimide film are laminated and adhered, the adhesion among a plurality of the polyimide films can be enhanced. This can provides the flow channel device that can be used under the environment where the fluid flowing through the flow channels has a high pressure, i.e., has a high property to withstand the pressure of the fluid flowing through the flow channels.

According to the embodiments of the present application, a flow channel device being durable under given environments can be produced.

These and other objects, features and advantages of the present application will become more apparent in light of the following detailed description of best mode embodiments thereof, as illustrated in the accompanying drawings.

Additional features and advantages are described herein, and will be apparent from the following Detailed Description and the figures.

DETAILED DESCRIPTION

Hereinafter, an embodiment of the present application will be described with reference to the drawings.

(1) First Embodiment

Figure 1:
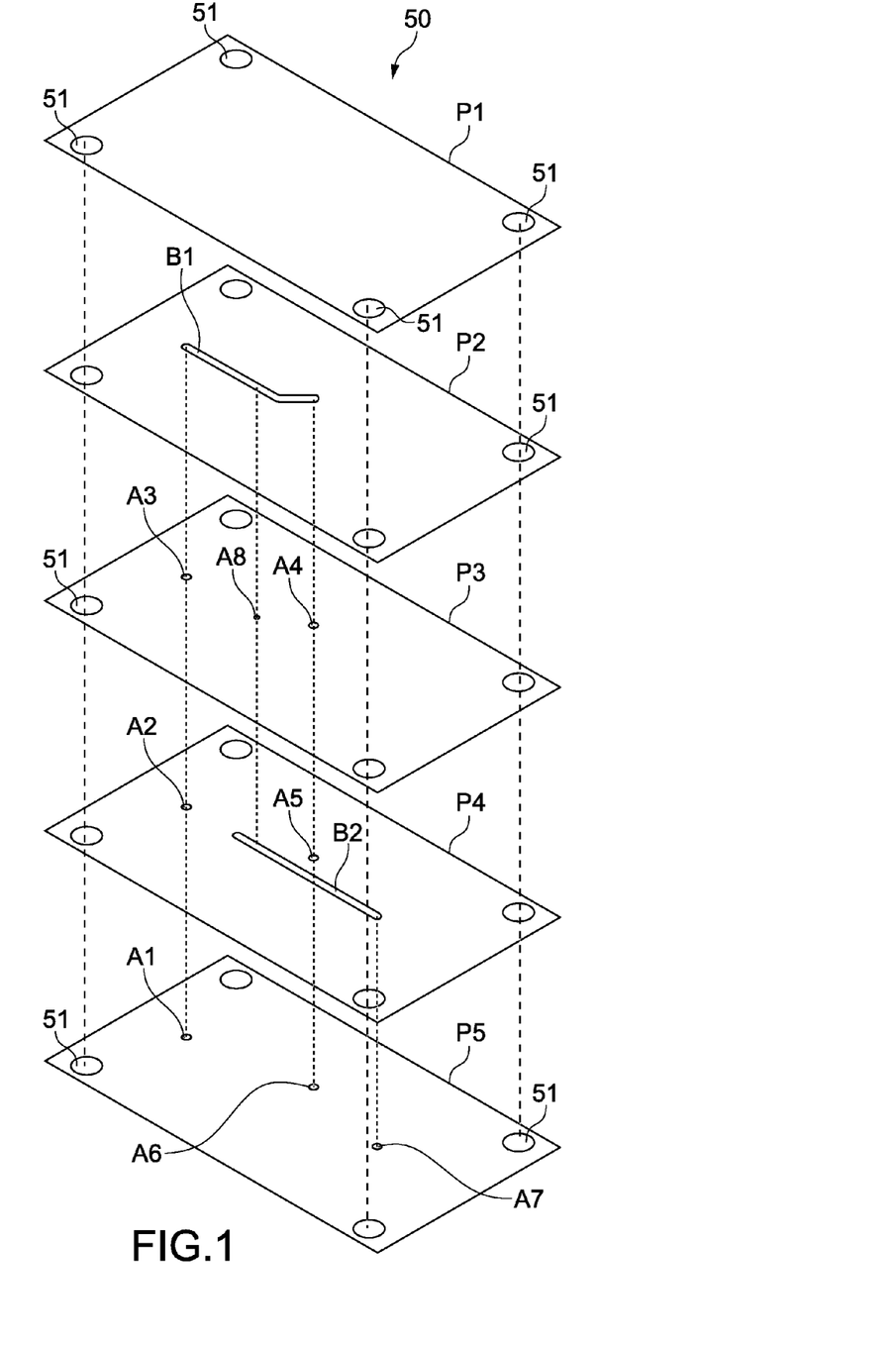
FIG. 1 is an exploded perspective view of a flow channel device according to a first embodiment of the present application.

FIG. 1 is an exploded perspective view of a flow channel device according to a first embodiment of the present application. The flow channel device according to the first embodiment is used as a device for analyzing cells by distributing a fluid containing particles such as cells as biological samples, as described later.

A flow channel device 50 has a plurality of, e.g., five polyimide films P1, P2, P3, P4 and P5. These polyamide films P1, P2, P3, P4 and P5 are laminated to form a main body of the flow channel device 50. Each of polyimide film P1 to P5 has substantially the same size and shape. In FIG. 1, the first, third and fifth layers from above, i.e., the polyimide films P1, P3 and P5, are non-thermoplastic polyimide films, and the second and fourth layers from above, i.e., the polyimide films P2 and P4, are thermoplastic polyimide films. In other words, the non-thermoplastic polyimide films P1, P3 and P5 and the thermoplastic polyimide films P2 and P4 are laminated alternately.

Hereinafter, the respective polyimide films (P1 to P5) refer simply to "films (P1 to P5). As necessary, "the polyimide film", "the thermoplastic polyimide film" and "the non-thermoplastic polyimide film" are used for description.

At any positions of any films of the films P1 to P5, ports A1 to A8 as holes are formed. In addition, at any positions of any films of the films P1 to P5, channels B1 and B2 as slits having any shapes are formed. These ports and channels penetrate through surfaces (upper surfaces) to rear surfaces (lower surfaces) of the films. Accordingly, these channels are communicated via the ports, and the ports are communicated via the channels. In this way, three dimensional flow channels having any shapes are formed through a number of layers. The film P1 has no port nor channel, and functions as a cover.

Figure 2:
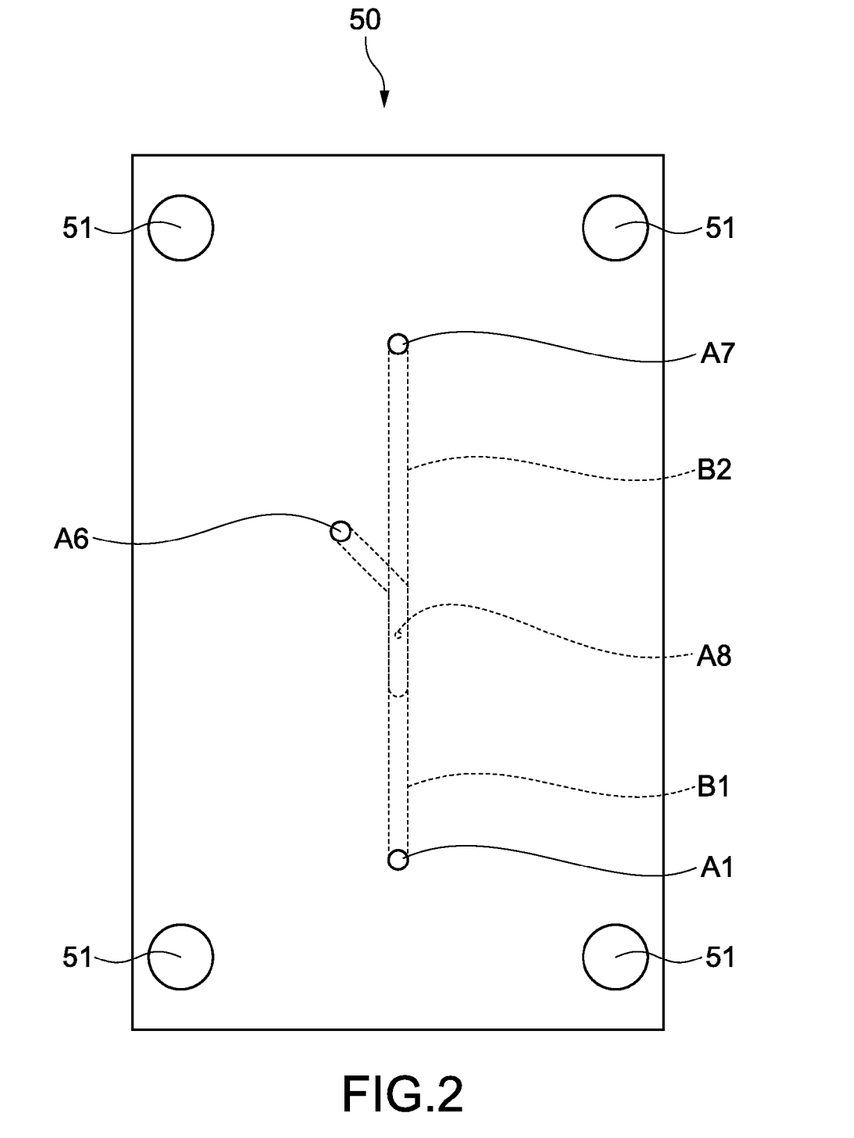
FIG. 2 is a plan view schematically showing the flow channel device shown in FIG. 1.

For ease of understanding the drawings, widths of the ports and channels are intentionally shown greater in FIGS. 1 and 2, but are actually fine such as several micrometers to several hundreds micrometers.

FIG. 2 is a plan view schematically showing the flow channel device 50 shown in FIG. 1, and mainly illustrates a configuration of the flow channels.

The films P2 to P4 are laminated such that parts of the channels B1 and B2 formed in the films P2 and P4 are overlapped views in plane as shown in FIG. 2. These channels B1 and B2 are communicated with the film P3 via a port A8 disposed as a narrow hole as described later.

For example, the port A1 disposed in the film P5 configures an inlet of a fluid from outside. The inlet port A1 is communicated with an upstream end of the channel B1 disposed in the film P2 via the ports A2 and A3 disposed in the films P4 and P3. The ports A6 and A7 disposed in the film P5 configures an outlet of the fluid to outside. The channel B1 is communicated with the channel B2 via the port A8 on the way. A downstream end of the channel B1 is communicated with the outlet port A6 via the ports A4 and A5 disposed in the films P3 and P4. A downstream end of the channel B2 is communicated with the outlet port A7.

A thickness of each of films P1 to P5 is, for example, 5 to 300 µm, preferably 10 to 100 µm, 20 to 80 µm, 40 to 60 µm, or 50 µm. The non-thermoplastic polyimide films P1, P3 and P5 may have different thicknesses from those of the thermoplastic polyimide films P2 and P4. In the first embodiment, the thermoplastic polyimide films P2 and P4 are thicker than the non-thermoplastic polyimide films P1, P3 and P5.

(2) Method of Producing Flow Channel Device

Figure 3:
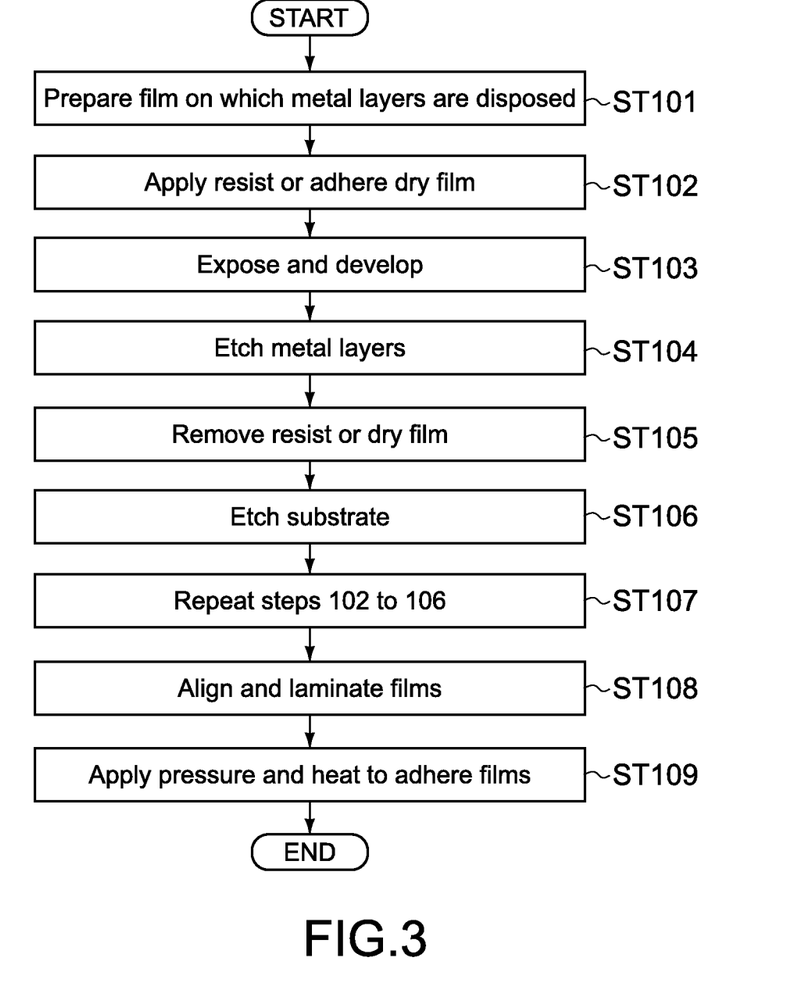
FIG. 3 is a flow chart showing steps of producing the flow channel device.

FIG. 3 is a flow chart showing steps of producing the flow channel device 50. FIGS. 4A to 4D and FIGS. 5A to 5D show a method of producing the non-thermoplastic polyimide film P3 as a layer having electrodes sequentially.

(a) Method of Producing Layer Having Electrodes

Figure 4A:
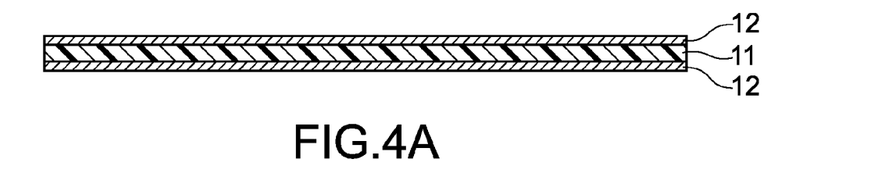
FIGS. 4A to 4D show a method of producing layers of a non-thermoplastic polyimide film sequentially.

As shown in FIG. 4A, the non-thermoplastic polyimide film 11 is used as the substrate. Metal layers 12 are disposed on both surfaces (upper and lower surfaces) of the substrate (Step 101). The metal layers 12 are formed by a plating method, a cast method, an adhesion method or the like. In some cases, in order to enhance the adhesion between the metal layers 12 and the non-thermoplastic polyimide film 11, some attempts may be made. As the polyimide film including the metal layers 12, a commercially available one such as a copper clad laminate can be used. As the material of the metal layers 12, copper is typically used, but other metals such as aluminum may be used.

Figure 4B:
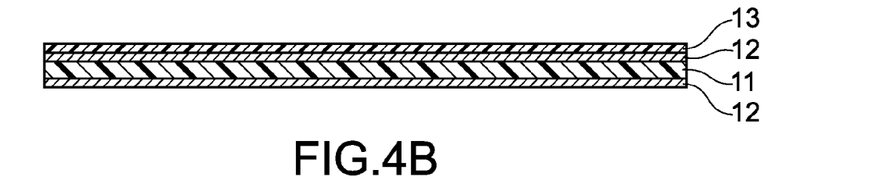
Figure 4C:
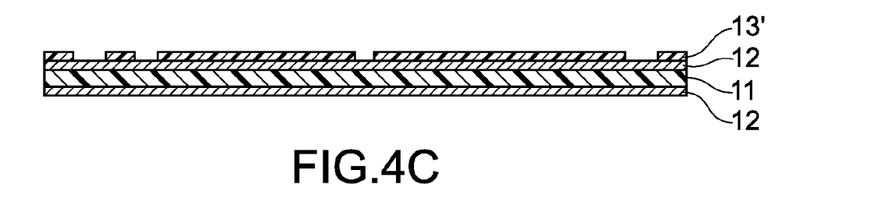

As shown in FIG. 4B, a photosensitive resist 13 is applied or a photosensitive dry film is adhered to the surface of the metal film 12 (Step 102). As shown in FIG. 4C, by exposure or development using an exposure mask having a predetermined channel or hole-shaped pattern, a resist or dry film pattern 13' is formed (Step 103). As the exposure mask, a chrome mask is used, for example.

Figure 4D:
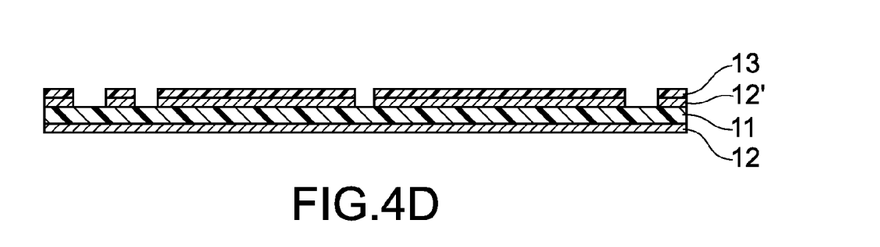

As shown in FIG. 4D, unnecessary portions of the metal layer are removed by etching (Step 104). In this way, a metal layer pattern 12' is formed. In this case, a wet etching method is used. An etching liquid is ferric chloride, potassium hydroxide or the like, for example.

Figure 5A:
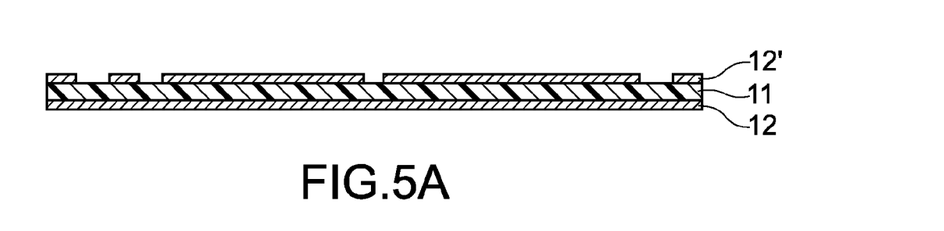
FIGS. 5A to 5D show a method of producing layers of a non-thermoplastic polyimide film sequentially.
Figure 5B:
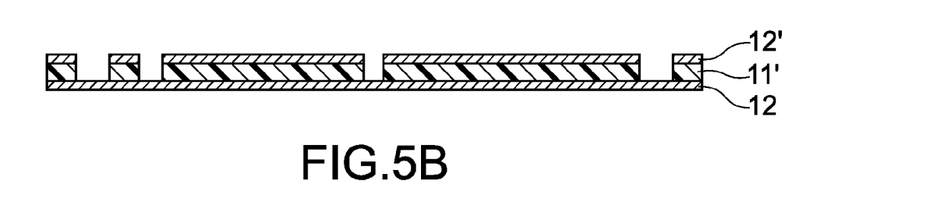

As shown in FIG. 5A, the resist or the dry film is removed (Step 105). As shown in FIG. 5B, a part of the non-thermoplastic polyimide film that is the substrate is etched by immersing the object into a strong alkaline liquid using the metal layer pattern 12' as the mask (Step 106). In this way, a non-thermoplastic polyimide film 11' is formed where holes are formed in the substrate. A part of the substrate may be removed by a laser processing using a UV laser or an excimer laser instead of etching. By using half-etching, concave grooves may be formed in the substrate.

Figure 5C:
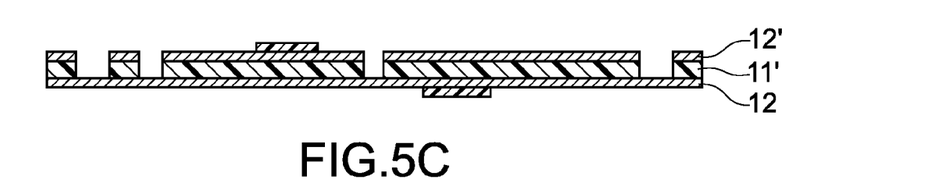
Figure 5D:
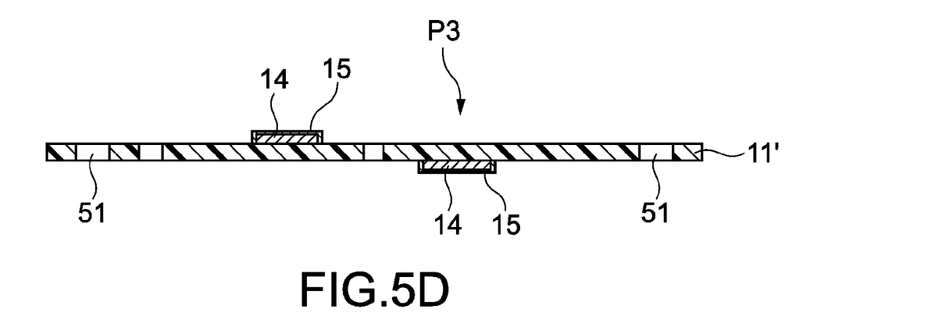

As shown in FIGS. 5C and 5D, by repeating the above-described patterning processings (Steps 102 to 106), the non-thermoplastic polyimide film 11' with a metal pattern having any shape, i.e., any electrode 14 pattern (Step 107). In the production method, electrodes 14 are formed on both surfaces (upper and lower surfaces) of the substrate 11.

As shown FIG. 5D, a plated layer 15 may be formed on the electrodes 14 by plating. For example, gold, platinum, palladium, nickel or chromium is used for the plated layer 15. With that, chemical resistance and anticorrosion of the electrodes 14 are improved.

(b) Method of Producing Layer Having No Electrodes

Thus far, the method of producing the film P3 having the metal layers 12 is described. The film P1, P2, P4 and P5 have the polyimide film substrates having no metal layers, and have ports, i.e., holes and/or channels, i.e., slits formed by the method similar to the patterning processing. In this case, when the substrate is etched, the dry film can be used as the mask.

Holes 51 are commonly formed at four corners of each film P1 to P5, into which positioning pins 22 are inserted for lamination and adhesion. These holes may be patterned as described above, or may be machined other than the patterning.

The film having the ports and channels may be desmeared. In this way, flowability of the fluid in the flow channels can be improved.

(c) Lamination and Adhesion

Figure 6A:
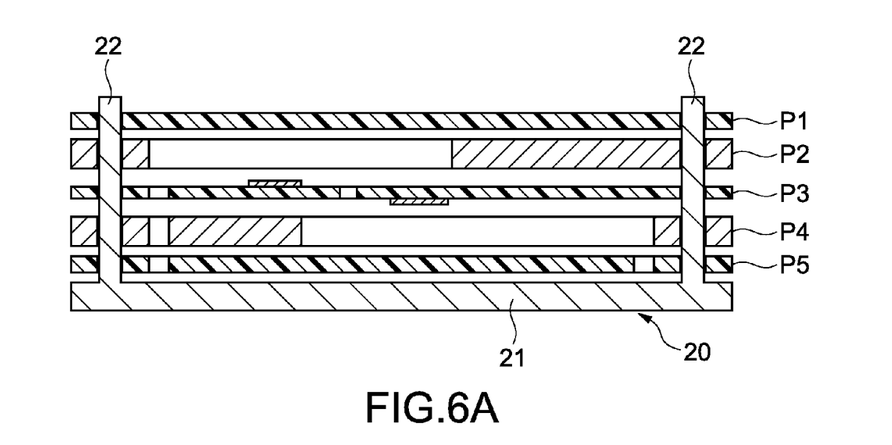
FIGS. 6A and 6B show steps of laminating and adhering a polyimide film.

As shown in FIG. 6A, the respective films P1 to P5 formed as described above are aligned. For example, a jig 20 including a base plate 21 and four pins 22 stood from the base plate 21 is prepared. The pins 22 are inserted into the respective holes 51 of the respective films P1 to P5. Reference marks (not shown) such as alignment marks are attached on the respective films P1 to P5. The reference marks are photographed to provide images, which are processed to determine acceptance or rejection of alignment. Highly precise alignment is thus possible. In this way, the respective films P1 to P5 are laminated (Step 108).

Figure 6B:
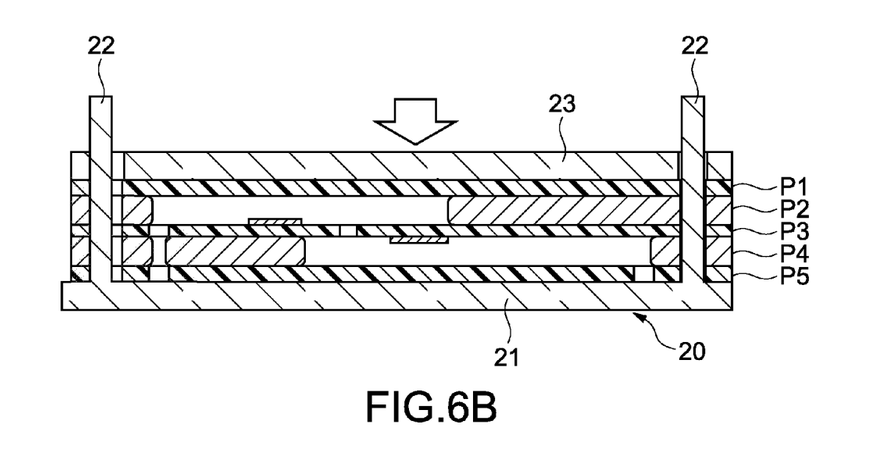

As shown in FIG. 6B, the jig 20 includes a retainer plate 23 disposed in parallel with the base plate 21. Between the retainer plate 23 and the base plate 21, the films P1 to P5 are inserted. Heat and pressure are applied thereto (Step 109). The heating temperature is around a glass transition temperature of thermoplastic polyimide (about 250° C.), e.g., 250° C.±50° C. By heating, the thermoplastic polyimide films P2 and P4 are soften and expanded to adhere to the non-thermoplastic polyimide films P1, P3 and P5. Thereafter, the films P1 to P5 adhered are cooled.

The pressure applied in Step 109 is such that expansion of the thermoplastic polyimide films P2 and P4 does not adversely affect the function of the flow channel device 50, specifically, there remains a space for configuring the flow channels. By selecting the heating temperature and the pressure applied appropriately, the expansion of the thermoplastic polyimide film can be decreased as low as about several micrometers. The heating temperature and the pressure applied may be selected depending on the shape, the application, the function and the like of the flow channel device 50 as appropriate.

In Step 109, the films P1 to P5 laminated are housed within an air-tight sustainable chamber. With the chamber in a reduced pressure, it is more desirable that the films P1 to P5 be adhered. By reducing the pressure, voids in the space for configuring the flow channels are removed, which prevents the voids from remaining within the flow channels.

In Steps 108 and 109, it is desirable that flatness and parallelism of the base plate 21 and the retainer plate 23 as high as possible in order to form fine flow channels having widths (vertical and horizontal widths) of several tens micrometers with high precision.

(3) Advantages of Flow Channel Device According to Embodiment of Present Application The flow channel device 50 according to the embodiment has the thermoplastic polyimide films P2 and P4. The thermoplastic polyimide films P2 and P4 are well adhered to the non-thermoplastic polyimide films P1, P3 and P5. As a result, there can be provided the flow channel device 50 that can be used under the environment where the fluid flowing through the flow channels has a high pressure, i.e., has a high property to withstand the pressure of the fluid flowing through the flow channels (hereinafter referred to as "a pressure withstanding property").

In particular, the flow channel device 50 has the non-thermoplastic polyimide films P1, P3 and P5 and the thermoplastic polyimide films P2 and P4. When a heat is applied, the non-thermoplastic polyimide films P1, P3 and P5 act to suppress deformation of the thermoplastic polyimide films P2 and P4, thereby forming the flow channels with high precision. The fine flow channels, e.g., the fine flow channels each having a width or a height lower than 100 μm may not hold their desired shape when the thermoplastic polyimide films are expanded by heat. However, the thermoplastic polyimide films are adhered to the non-thermoplastic polyimide films, where the shape can be maintained even if the fine flow channels are used.

Specifically, the thermoplastic polyimide films and the non-thermoplastic polyimide films are laminated alternately. This promotes the enhancement of the adhesion and the formation of the highly precise flow channels.

As the respective films P1 to P5 are well adhered, the pressure withstanding property of the flow channels is improved to increase a flow rate of the fluid. Thus, as the flow rate of the fluid can be increased, a sample having low flowability can also be transported through the flow channels at a high pressure. The finer flow channels are, the higher a flow channel resistance is. As such, fluid conditions including a high flow rate and a high pressure are increasingly important.

The present inventor carried out the experiment that physiological saline was delivered by applying a pressure through the flow channels via an inlet port (for example, the port A1), closed outlet ports (for example, the ports A6 and A7) and increased the pressure. As a comparative embodiment to the flow channel device according to the embodiment of the present application, a flow channel device (not shown) where an adequate adhesion was carried out by using an epoxy film. When an increase of the pressure in the flow channels was successively measured by a time scale and a curve is drawn based on the measurement, the curve starts to decline at the timing that the flow channels are broken. The present inventor defined the pressure at the timing as a withstanding pressure and evaluated the pressure withstanding property.

As a result, the flow channel device according to the comparative embodiment had the withstanding pressure of about 100 kPa. On the other hand, when no adhesive was used and the thermoplastic polyimide was used, the flow channels were not broken even at 1 MPa that was an upper limit of a pressure meter prepared. It concluded that the withstanding pressure of the flow channels was 1 MPa or more.

As the adhesive is unnecessary to adhere the films according to the present application, biological samples are not damaged by the adhesive even if the fluid containing the biological samples flows through the flow channel device. In addition, as the flow channel device has high chemical resistance, alcohols, organic solvents, acids and the like as well as the physiological saline can be used as the fluid.

As no adhesive is used and the polyimide film is used in the flow channel device, chemical resistance and heat resistance become high. As the heat resistance becomes high, high pressure steam sterilization is available for each fluid channel device. Also, as the heat resistance becomes high, the flow channel device according to the embodiment of the present application is applicable to chemical synthesis including any reaction, a fuel cell, or the like.

As no adhesive is used, a step of forming an adhesive layer can be omitted, thereby simplifying the manufacturing process and decreasing the manufacturing costs.

According to the embodiment, the flow channel device having the electrodes can be produced in large quantity at low costs, which leads to decrease inspection costs, reaction costs, etc.

Furthermore, the flow channel device 50 according to the embodiment is configured by laminating the polyimide films, which results in a flexible flow channel device.

(4) Usage Embodiment of Flow Channel Device

Figure 7:
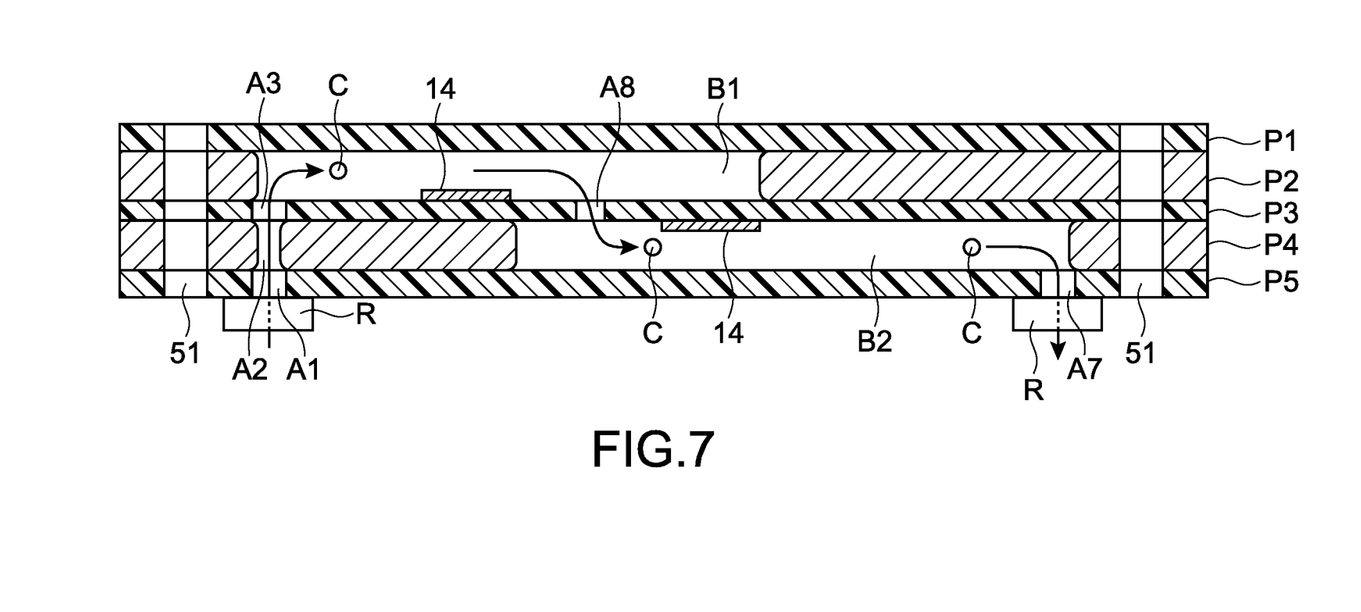
FIG. 7 is a view for illustrating a usage embodiment of the flow channel device.

A usage embodiment of the flow channel device 50 shown in FIGS. 1 and 2 will be described. FIG. 7 is a view for illustrating the usage embodiment thereof.

To the port A1 at a surface side of the film P5 of the fluid channel device 50, a pump (not shown) is connected via a sealing material R such as an O-ring. To the port A7 of the film P5, a container (not shown) for pooling the fluid discharged from the flow channels is connected via the sealing material R. The sealing material R may be formed by adhering a soft material such as silicone rubber to the fluid channel device 50 in advance.

The port A4 connected to the channel B1 may be closed or used for other application. In the other application, when the channels B1 and B2 have respective inlets, the fluid flows through the channels B1 and B2 at different flow rates.

For example, the physiological saline including cells C such as blood cells is used as the fluid. By a driving force of the pump, the physiological saline flows into the flow channels via the port A1 of the fluid channel device 50 and flows into the channel B1 via the ports A2 and A3. The fluid including the cells C flowed into the channel B1 flows into the channel B2 via the port A8 disposed as the narrow hole, and is discharged from the outlet port A7.

Around the port A8 disposed as the narrow hole, the above-described electrodes 14 are disposed facing each other and sandwiching the narrow hole. For example, the electrodes 14 are disposed on the upper surface and the lower surface of the substrate of the film P3, respectively. To an electrode pair of the electrodes 14, devices (not shown) including a signal generator for applying AC voltage signals and an analyzer for analyzing signals measured by the electrode pair are electrically connected. The analyzer can measure electric quantity of the cells C when the cells C pass through the narrow hole, specify kinds of the cells C and counter the cells C.

2. Second Embodiment

Figure 8:
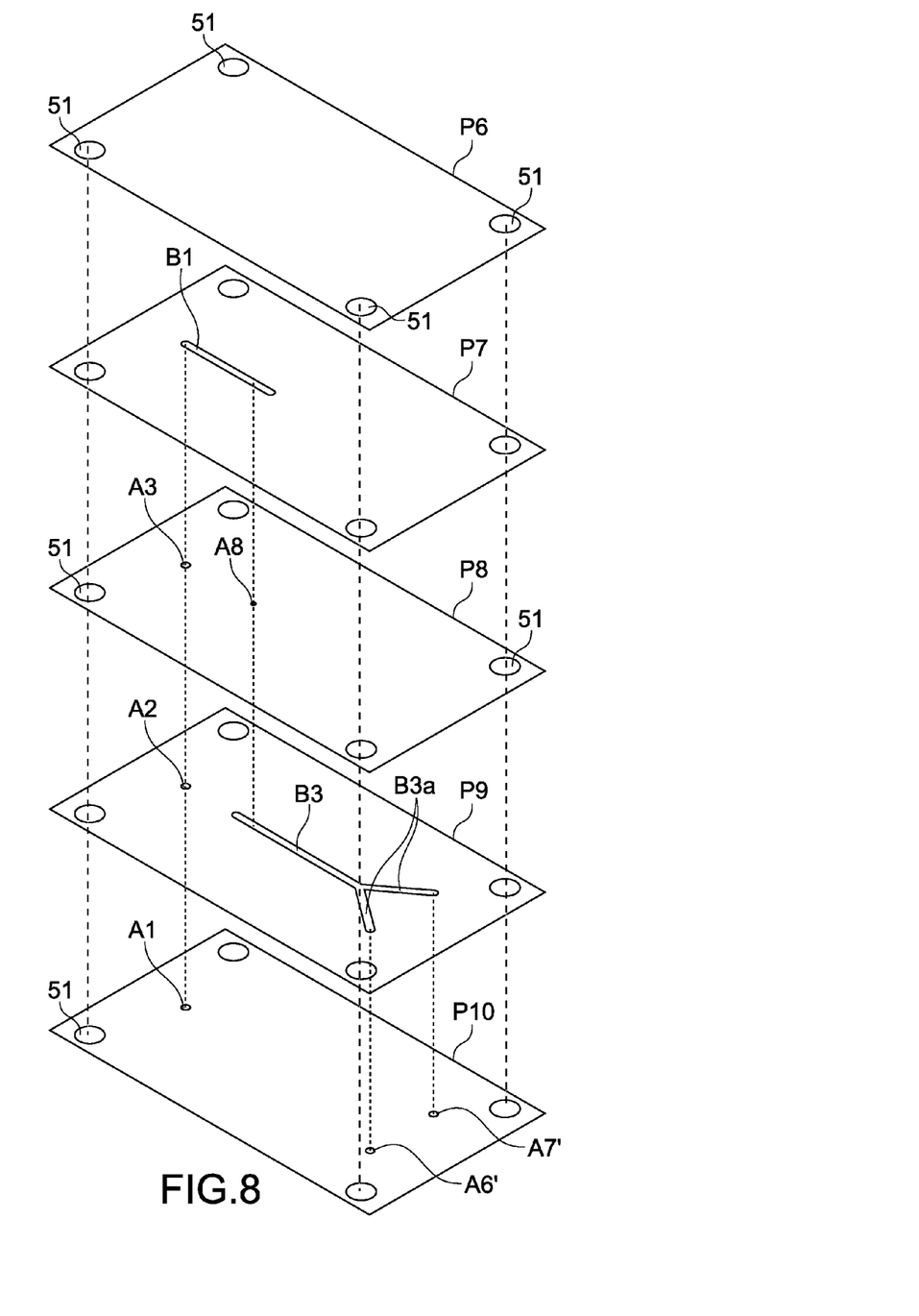
FIG. 8 is an exploded perspective view of a flow channel device according to a second embodiment of the present application.
Figure 9:
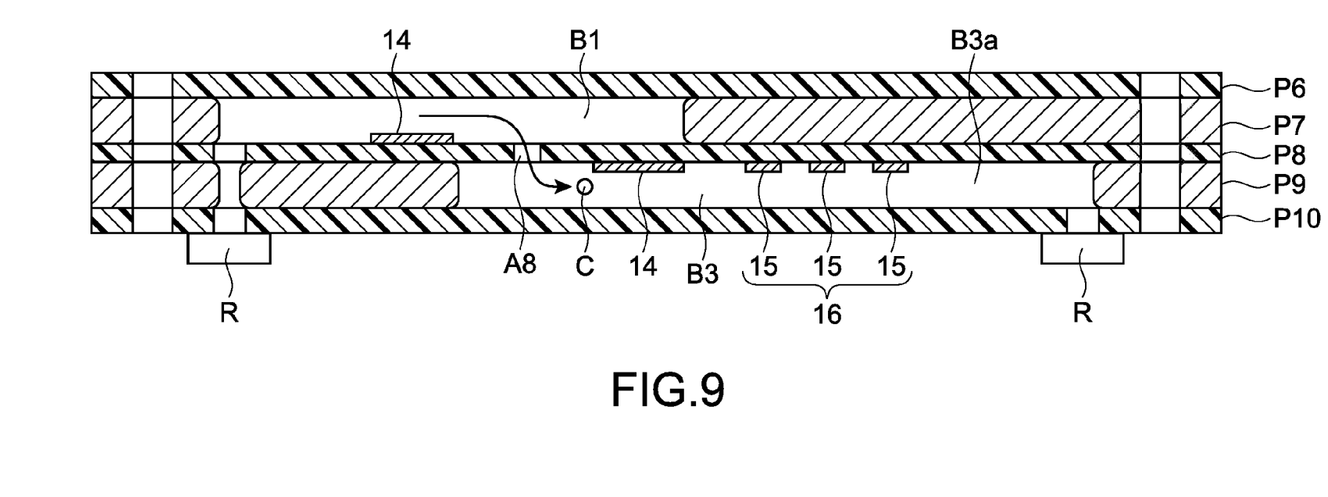
FIG. 9 is a sectional view of the flow channel device in FIG. 8.

FIG. 8 is an exploded perspective view of a flow channel device according to a second embodiment of the present application. FIG. 9 is a sectional view thereof. In the following description, the members, the functions and the like similar to those of the fluid channel device 50 according to the embodiment shown in FIG. 1 are simplified or omitted, and different points are mainly shown.

A flow channel device 60 has a plurality of films, e.g., five polyimide films P6 to P10. Also, in this case, the non-thermoplastic polyimide films P6 and P8 and P10 and the thermoplastic polyimide films P7 and P9 are laminated alternately. The film P9 has a channel B3 including a Y-shaped branched channel B3a communicated with a downstream end of the channel of the film P7. The film P10 has two ports A6' and A7' that are fluid outlets and are communicated with downstream ends of the branched channel B3a of the film P9.

As shown in FIG. 9, the film P8 has an electrode pair (electrodes 14) sandwiching a narrow hole, i.e., the port A8 and also a working electrode section 16 including a plurality of electrodes 15 at a downstream side of the flow channel lower than the position where the electrode pair is disposed. At a downstream side of the working electrode section 16, the channel B3a branched as described above is disposed. A device such as a computer (not shown) specifies the cells C based on the electric quantity detected when the cells C pass through the port A8, i.e., the narrow hole. Thereafter, when a working voltage is, for example, applied to the working electrode section 16, the cells C are provided with electrophoretic force or dielectrophoretic force. When the phoretic force is generated by applying the working voltage or is not generated, the cells C are guided to either of the two branched flow channels.

Thus, according to the present application, the flow channel device such as a cell sorter can be provided.

3. Flow Channel Device According to Other Embodiments and Usage Embodiments

As the flow channel device produced as described above has high flexibility, by utilizing its bendability and the flexibility, the flow channel device can be freely disposed on an uneven surface or a surface having curvature.

Figure 10:
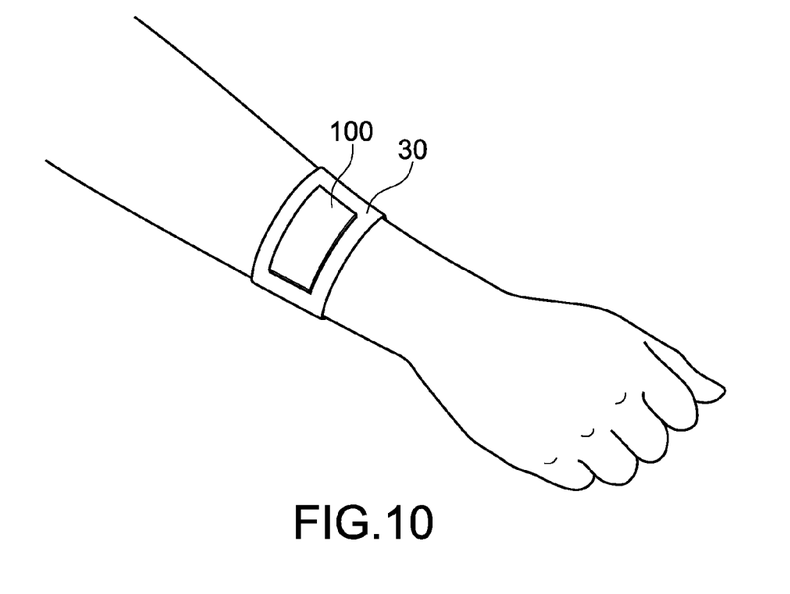
FIG. 10 shows a human arm wearing the flow channel device.

FIG. 10 shows a human arm wearing the flow channel device. As described above, a flow channel device 100 is flexible, and can be therefore mounted on a human arm by a means such as a taping 30. It is possible to continuously acquire the biological samples such as human sweat. As the flow channels provided to the flow channel device 100 can generate capillary force in a liquid, the flow channel device 100 can take the sweat in the flow channels, and analyze the constituents of the sweat. Alternatively, the flow channel device 100 can be used to slowly release a medicament into a living body.

Figure 11:
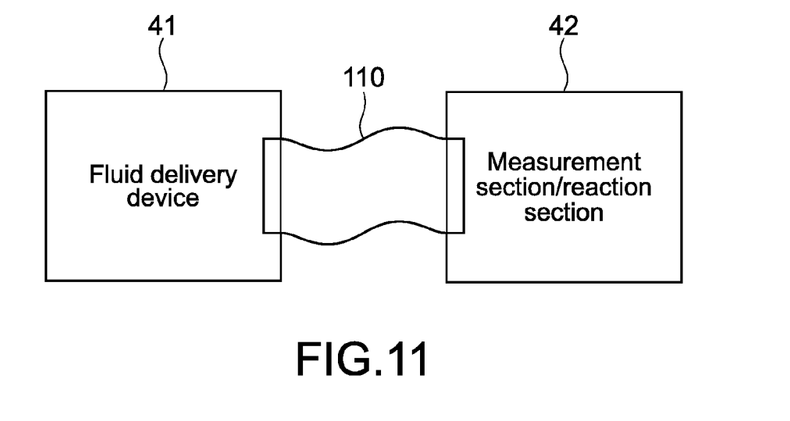
FIG. 11 shows an embodiment of the flow channel device used as a device including flow channels and electrical circuits connected between devices.

FIG. 11 shows an embodiment of the flow channel device used as a device including flow channels and electrical circuits connected between devices. As other embodiment, as shown in FIG. 11, for example, a flexible flow channel device 110 may be connected between a plurality of the devices. Here, a fluid delivery device 41 for delivering a fluid and a measurement section/a reaction section for carrying out a measurement, a reaction or other operation are connected by the flexible flow channel device 110. The flow channel device 110 can include a plurality of parallel flow channels, or complex flow channels separated or joined. For example, the flow channel device 110 includes the flow channels and electric circuits, and carries out exchange fluid and electric signals between a plurality of the devices.

Thus, by utilizing the flexibility, the flow channel device 100 according to the embodiment of the present application can provide interconnection between a plurality of devices in a complex device, which leads to decrease a size and costs of the device.

As other embodiments, an ink tube and a discharge head connected to an ink tank in a printer can be replaced with the flow channel device 110 according to the embodiment of the present application.

4. Other Embodiments

The present application is not limited to the above-described embodiments, and other various embodiments may be made.

In the above-described embodiments, the flow channel device 50 is configured by alternately laminating the non-thermoplastic polyimide films and the thermoplastic polyimide films. However, at least one thermoplastic polyimide film may be included in the flow channel device 50. Furthermore, a plurality of a plurality of the polyimide films may be laminated successively. Moreover, all the layers may be the thermoplastic polyimide films.

Although the metal layers according to the embodiment are formed as members having electrical functions, the metal layers may be formed as members having mechanical functions such as a reinforcing material.

Although the channels formed in the film are slits formed through the film in the embodiment, the channels may be concave grooves that are not penetrated through the film.

It is also possible to combine at least two features of the features in each embodiment described above.

It should be understood by those skilled in the art that various modifications, combinations, sub-combinations and alterations may occur depending on design requirements and other factors insofar as they are within the scope of the appended claims or the equivalents thereof.

The present application may have the following configurations.

(1) A method of producing a fluid channel device, including:
laminating a plurality of polyimide films including at least one polyimide film having a port and at least one polyimide film having a channel, the polyimide films including at least one thermoplastic polyimide film; and
adhering a plurality of the polyimide films by applying heat such that the ports are communicated with the channels.

(2) The method of producing a fluid channel device according to (1) above, in which
at least one non-thermoplastic polyimide film is used for a plurality of the polyimide films.

(3) The method of producing a fluid channel device according to (1) above, in which
the thermoplastic polyimide film and the non-thermoplastic polyimide film are laminated alternately.

(4) The method of producing a fluid channel device according to any one of (1) to (3) above, further including applying a pressure to a plurality of the polyimide films laminated.

(5) The method of producing a fluid channel device according to (4) above, in which
a plurality of the polyimide films laminated are sandwiched between two plate materials disposed in parallel.

(6) The method of producing a fluid channel device according to any one of (1) to (5) above, in which
the polyimide films laminated are heated at around a glass transition temperature of polyimide.

(7) The method of producing a fluid channel device according to any one of (1) to (6) above, in which
at least one the polyimide film of a plurality of the polyimide films has a metal layer disposed on a surface of the polyimide film, and further including
processing the metal layer to form a metal pattern having any shape before the lamination.

(8) The method of producing a fluid channel device according to any one of (1) to (7) above, further including
housing a plurality of the polyimide films laminated within an air-tight holding chamber, and
adhering a plurality of the polyimide films laminated with the chamber in a reduced pressure.

(9) The method of producing a fluid channel device according to any one of (1) to (8) above, in which
the flow channel device is used for distributing a fluid containing biological samples.

(10) A flow channel device, including:
a main body where a plurality of polyimide films including at least one polyimide film and at least one polyimide film are laminated and adhered;
a port disposed on at least one polyimide film of a plurality of the polyimide films; and
a channel disposed on at least one polyimide film of a plurality of the polyimide films to form flow channels being communicated with the port.

(11) The flow channel device according to (10) above, which is used for distributing a fluid containing biological samples.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A method of producing a fluid channel device, comprising:
laminating a plurality of polyimide films by alternately laminating a plurality of non-thermoplastic polyimide films with at least one thermoplastic polyimide film, at least one of the non-thermoplastic or thermoplastic polyimide films having a port, and at least one of the non-thermoplastic or thermoplastic polyimide films having a channel; and
adhering the alternating non-thermoplastic polyimide films and thermoplastic polyimide films to form a laminated structure by applying heat, wherein at least one port on one of the polyimide films is communicated with a channel on an adjacent one of the polyimide films,
wherein outer layers of the laminated structure are non-thermoplastic polyimide films.

2. The method of producing a fluid channel device according to claim 1, further comprising:
applying a pressure to the laminated structure.

3. The method of producing a fluid channel device according to claim 2, wherein
a the laminated structure is sandwiched between two plate materials that are disposed in parallel.

4. The method of producing a fluid channel device according to claim 1, wherein
the laminated structure is heated at around a glass transition temperature of the thermoplastic polyimide film.

5. The method of producing a fluid channel device according to claim 1, wherein at least one of the non-thermoplastic polyimide films has a metal layer disposed on a surface thereof, the method further comprising processing the metal layer to form a metal pattern before the lamination.

6. The method of producing a fluid channel device according to claim 1, further comprising:

housing the laminated structure within an air-tight holding chamber, and adhering the thermoplastic and non-thermoplastic polyimide films of the laminated structure within the chamber at a reduced pressure.

7. A flow channel device, comprising:

a main body including a plurality of polyimide films, the polyimide films including a plurality of non-thermoplastic polyimide films alternately laminated and adhered with at least one thermoplastic polyimide film;

wherein at least one port on one of the polyimide films is communicated with a channel on an adjacent one of the polyimide films, and wherein outer layers of the laminated structure are non-thermoplastic polyimide films.

\* \* \* \* \*